United States Patent [19]

Smith

[11] Patent Number: 5,441,295
[45] Date of Patent: Aug. 15, 1995

[54] LOCK ASSEMBLY FOR A TRAILER HITCH

[76] Inventor: James E. Smith, P.O. Box 8785, Lumberton, Tex. 77711

[21] Appl. No.: 210,928

[22] Filed: Mar. 21, 1994

[51] Int. Cl.6 .................. B60D 1/28; B60R 25/00
[52] U.S. Cl. ................................ 280/507; 70/232; 70/258; 280/511
[58] Field of Search .............. 280/507, 504, 511; 70/14, 232, 258

[56] References Cited

U.S. PATENT DOCUMENTS 3,567,253  3/1971  De Puydt ........................ 280/512
4,776,607  10/1988  Richter et al. .................. 280/507

*Primary Examiner*—Mitchell J. Hill
*Attorney, Agent, or Firm*—Phillip A. Rein

[57] ABSTRACT

A hitch lock assembly which is readily attachable to a trailer hitch assembly to provide a means for securing a hitch ball latch assembly from unauthorized removal from a hitch ball member. The hitch lock assembly includes a pair of lock pin members operable with a padlock member to provide means for securing the hitch ball latch assembly about the hitch ball member. Each lock pin member is of a high strength steel rod construction having a vertical hitch lock section mountable within aligned holes through a main hitch housing assembly and a ball contact member to insure that these elements are not movable relative to each other to an unlatched condition. The padlock member is removed from the interconnected lock pin members and the hitck lock sections are removed from the aligned holes to achieve an unlatched condition.

15 Claims, 1 Drawing Sheet

LOCK ASSEMBLY FOR A TRAILER HITCH

PREFERRED EMBODIMENT OF THE INVENTION

In one preferred embodiment of this invention is provided a lock assembly for a trailer hitch which can be mounted on a vehicle in a conventional manner. More particularly, a pickup truck is illustrated as having a rear bumper assembly with a vertically mounted hitch ball member operable to receive a trailer hitch assembly thereon.

The lock assembly includes a trailer hitch assembly having a hitch lock assembly of this invention mounted thereon. The trailer hitch assembly includes 1) a trailer tongue member which is mounted on a trailer member (not shown); 2) a main hitch housing assembly connected to the trailer tongue member as by welding or the like; and 3) a hitch ball latch assembly mounted within the main hitch housing assembly.

The main hitch housing assembly is of generally U-shape in transverse cross section having a top wall integral with parallel spaced side walls, all of which are integral with a common front wall. The spaced parallel side walls are provided with axially aligned respective latch receiving openings therein.

The hitch ball latch assembly is provided with a forward ball receiver member mounted within the main hitch housing assembly which operably cooperates with a latch actuator assembly.

The forward ball receiver member is provided with an arcuate ball receiving surface of a spherical shape similar to the hitch ball member which is integral with an anchor housing secured to an inside forward surface of the main hitch housing assembly.

The latch actuator assembly includes 1) a latch handle member pivotally connected to the parallel side walls of the main hitch actuator assembly; 2) an intermediate link member having one end pivotally connected to the latch handle member and 3) a ball contact member pivotally connected to an opposite end of the intermediate link member and to the spaced parallel side walls of the main hitch housing assembly.

The latch handle member includes a handle section having holes therethrough to receive a handle support shaft therein for pivotal movement thereof upwardly from a latched condition and downwardly to a latched condition as will be explained.

The intermediate link member includes a handle connector section and an actuator ball connector section. The handle connector section is mounted through a pivot shaft or pin to the latch handle member.

The actuator ball connector section is provided with a pivot shaft or pin for pivotal connection to the ball contact member for subsequent movement thereof between the latched to the unlatched conditions.

The ball contact member includes a pair of spaced, parallel main actuator bodies which are pivotally connected to a support shaft member for movement from the latched to the unlatched conditions.

More particularly, each main actuator body is of irregular shape and provided with 1) a shaft connector hole to receive the support shaft member therethrough; 2) a lock anchor hole is operable to receive a portion of the hitch lock assembly therein in the locked anchored condition as will be noted; and 3) an arcuate ball contact section operable to engage a portion of an outer surface of the hitch ball member while cooperating with the arcuate ball receiving surface of the forward ball receiver member when in the locked clamped condition as will be explained.

The trailer hitch assembly is operable in a substantially conventional manner whereupon the hitch ball member is placed interiorly of the main hitch housing assembly and having an upper, outer surface nested within the arcuate ball receiving surface of the forward ball receiver member which is part of the hitch ball latch assembly as noted in FIG. 5.

On pivotal movement of the latch handle member forwardly and downwardly from the position of FIG. 5 to the position of FIG. 6, it is seen that the hitch ball member is enclosed in a confining relationship between the arcuate ball receiving surface of the forward ball receiver member and the arcuate ball contact section of the ball contact member to hold in the enclosed latched condition. However, this latched condition is further enhanced and made secure from dislodgment and further from one stealing the trailer hitch assembly and a trailer member connected thereto through use of the hitch lock assembly of this invention.

The hitch lock assembly includes a pair of lock pin members used in conjunction with a conventional padlock member.

The lock pin members are identical, each having a padlock section integral with a horizontal spacer section which, in turn, is integral with a vertical intermediate section which is integral with a second horizontal spacer section having at an outer end thereof an integral vertical hitch lock section.

Each lock pin member is of a bent rod construction, circular shape in transverse cross section and preferably constructed of a high strength steel material.

The padlock section is provided with a circular ring portion having an outer bent end thereof secured as by welding to an adjacent portion of the horizontal spacer section. The ring portion is operable to receive a portion of the padlock member therethrough as will be explained.

The vertical intermediate section is extended perpendicular to both the horizontal spacer section and the second horizontal spacer section which are extended parallel to each other in a same direction from the vertical intermediate section.

The vertical hitch lock section is extended perpendicular to the second horizontal spacer section and extended downwardly therefrom. The cross sectional size of the lock pin members is of a size to fit snugly within respective latch receiving openings in the parallel side walls of the main hitch housing assembly and, additionally, the lock anchor holes in the main actuator bodies of the ball contact member when in the latched, locked conditions as noted in FIGS. 2 and 4.

The padlock member can be of a conventional key lock or combination dial lock configuration. The padlock member includes a padlock body section having a shackle member having a portion releasably connected to the padlock body section to move from the locked condition of FIG. 2 to an unlatched condition in a manner to be explained.

OBJECTS OF THE INVENTION

One object of this invention is to provide a lock assembly for a trailer hitch mounted on a vehicle including 1) a trailer hitch assembly secured to a hitch ball member on the vehicle; and 2) a hitch lock assembly releasably connected to the trailer hitch assembly to secure in the connected latched condition to prevent unauthorized removal of the trailer hitch assembly from the hitch ball member.

Another object of this invention is to provide a hitch lock assembly which can be readily attached and removed from a trailer hitch assembly connected to a hitch ball member on a vehicle to hold in a latched and securely locked condition to prevent unauthorized removal of the trailer hitch assembly from the hitch ball member.

One other object of this invention is to provide a hitch lock assembly mountable on a trailer hitch assembly connected to a hitch ball member including a pair of irregular shaped lock pin members operable in combination with a padlock member with the lock pin members engagable through openings in the trailer hitch assembly to achieve an enclosed locked condition when the padlock member is secured to adjacent portions of the lock pin members to secure in a locked, latched condition.

One further object of this invention is to provide a hitch lock assembly having a pair of irregular shaped lock pin members cooperating with a padlock member, and the lock pin members are engagable with parallel side walls of a main hitch housing assembly and a latch actuator assembly when in the latched condition so as to be unable to move the latch actuator assembly to an unlatched condition due to the padlock member interconnecting adjacent circular portions of the lock pin members.

Still, one other object of this invention is to provide a hitch lock assembly comprising a pair of lock pin members used in combination with a padlock member which is economical to manufacture; simple to use; sturdy in construction; providing economical means for anchoring a hitch ball assembly to a hitch ball member in the latched condition; and substantially maintenance free.

Various other objects, advantages, and features of the invention will become apparent to those skilled in the art from the following discussion, taken in conjunction with the accompanying drawings, in which:

FIGURES OF THE INVENTION

Figure 1:
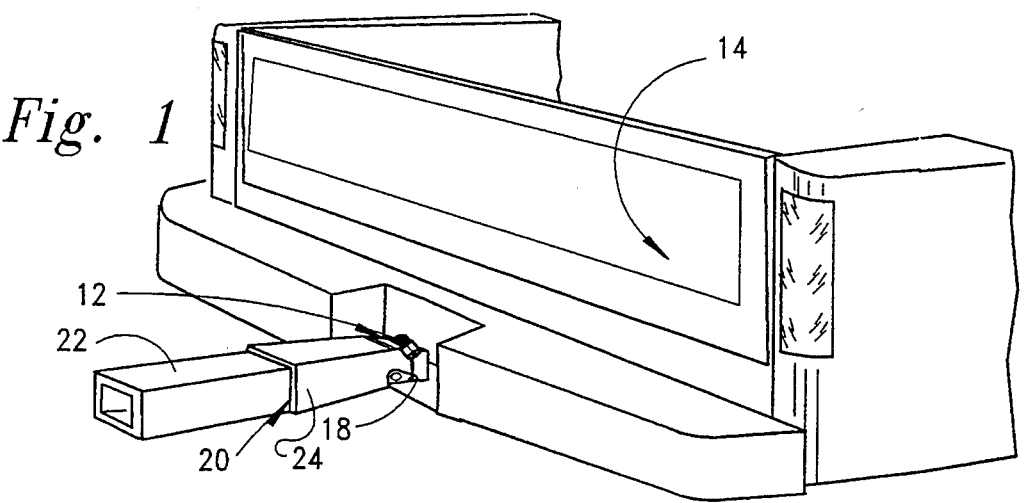
FIG. 1 is a perspective view of a rear end of a pickup truck having a trailer hitch assembly connected thereto utilizing the hitch lock assembly of this invention.

The following is a discussion and description of preferred specific embodiments of the lock assembly for a trailer hitch of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a lock assembly for a trailer hitch, indicated generally at 12, is shown as being mounted on a trailer hitch assembly 20 connected to a hitch ball member 18 anchored to a rear bumper of a pickup truck 14. The hitch ball member 18 and the trailer hitch assembly 20 are of a conventional nature as will be noted herein.

The lock assembly for a trailer hitch 12 is releasably connectable to the trailer hitch assembly 20 which may be connected to a stock trailer, U-Haul trailer, or the like for trailering same.

The trailer hitch assembly 20 includes 1) a trailer tongue member 21 of rectangular, tubular shape in transverse cross section having one end secured to a trailer member (not shown); 2) a main hitch housing assembly 24 connected to another outer end of the trailer tongue member 21; and 3) a hitch ball latch assembly 26 connected to the main hitch housing assembly 24 and engagable with an outer surface of the hitch ball member 18 in a latched, locked condition.

The main hitch housing assembly 24 is secured as by welding to the trailer tongue member 21 and includes a top wall 28 integral with downwardly depending spaced parallel side walls 29, all of which are integral with a front wall 31.

Each parallel side wall 29 is provided with a latch receiving opening 33 therein to receive a portion of the hitch lock assembly 22 therein when in the locked, latched condition as will be explained.

Figure 4:
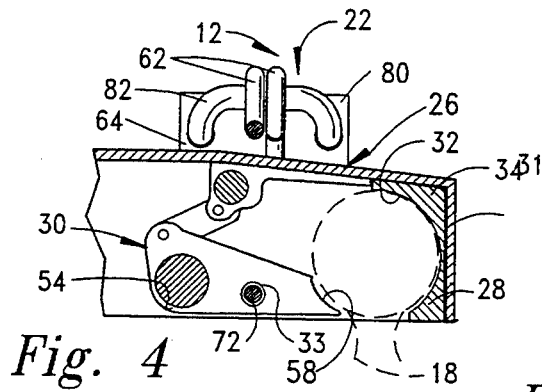
FIG. 4 is a sectional view taken along line 4—4 in FIG. 2.
Figure 5:
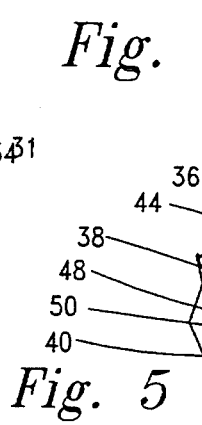
FIG. 5 is a view similar to FIG. 4 having the hitch lock assembly removed and illustrating the trailer hitch assembly in an unlatched condition about a hitch ball member illustrated in dotted lines.

As noted in FIG. 4, the hitch ball latch assembly 26 includes a forward ball receiver member 28 acting in cooperation with a latch actuator assembly 30 to releasably secure the hitch ball member 18 within the main hitch housing assembly 24 in the latched or unlatched conditions as shown in FIGS. 4 and 5, respectively.

The forward ball receiver member 28 is provided with an arcuate ball receiving surface 32 and an anchor housing 34 which is secured as by welding to inner adjacent surfaces of the main hitch housing assembly 24 or, more specifically, secured to the top wall 28, parallel side walls 29, and front wall 31.

The arcuate ball receiving surface 32 is of a spherical shape similar in size to the hitch ball member 18 which is mounted thereagainst in a clamping action while allowing pivotal movement of the trailer tongue member 21 and interconnected main hitch housing assembly 24 thereabout during normal turning and driving operations of the pickup truck 14.

The latch actuator assembly 30 includes 1) a latch handle member 36 which is pivotally connected to the parallel side walls 29 of the main hitch housing assembly 24; 2) an intermediate link member 38 having one end pivotally connected to the latch handle member 36; and 3) a ball contact member 40 pivotally connected to another end of the intermediate link member 38 and pivotally connected to the main hitch housing assembly 24.

Figure 2:
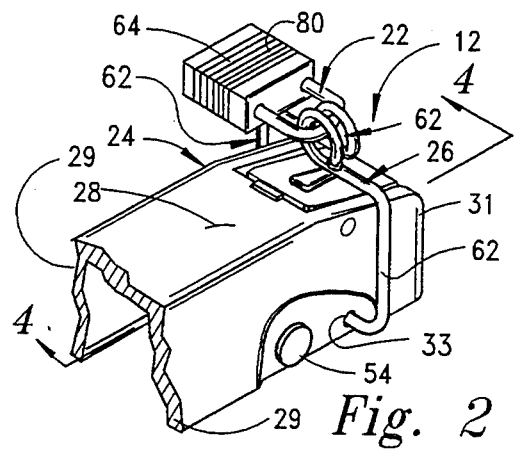
FIG. 2 is a fragmentary perspective view of a trailer hitch assembly having the hitch lock assembly of this invention mounted thereon.
Figure 3:
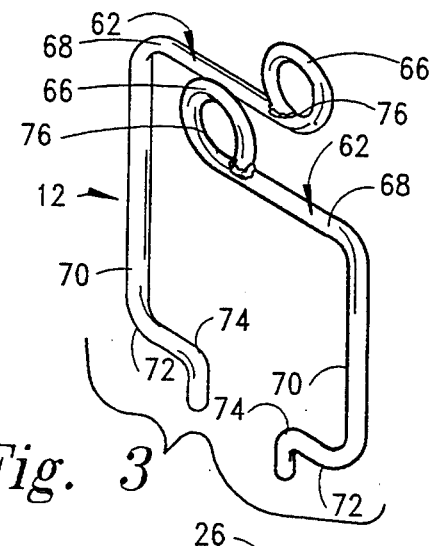
FIG. 3 is a perspective view of one of a pair of lock pin members of the hitch lock assembly of this invention.

The latch handle member 36 includes a grasp handle section 42 and being pivotally connected to a handle support shaft 44 which extends through and is mounted within aligned openings in the parallel side walls 29 for movement from the released condition of FIG. 5 to the latched condition as noted in FIGS. 2 and 4.

The intermediate link member 38 has a handle connector section 46 and an actuator ball connector section 48. The handle connector section 46 is pivotally connected through a pivot shaft or pin 50 within a hole in the latch handle member 36.

The actuator ball connector section 48 is provided with the pivot pin or shaft 50 which is mounted in a hole in the ball contact member 40.

As noted in FIG. 5, the ball contact member 40 is provided with a pair of spaced, parallel main actuator bodies 52 of irregular shape which are pivotally mounted on a support shaft member 54.

Each main actuator body 52 is provided with 1) a shaft connector hole 56 operable to receive the support shaft member 54 therethrough; 2) lock anchor holes 60 on each side of the identical ones of the main actuator bodies 52 to receive a portion of the hitch lock assembly 22 therein as will be explained; and 3) an arcuate ball contact section 58 interconnecting the main arcuate bodies 52 which is of a spherical shape and is operable to engage in an adjacent, conforming spaced relationship with the hitch ball member 18 when in the latched condition as noted in FIG. 4.

The arcuate ball contact section 58 being of spherical shape cooperates with the arcuate ball receiving surface 32 of the forward ball receiver member 28 of the hitch ball latch assembly 26 as noted in FIG. 4. This firmly holds the hitch ball member 18 in an enclosed latched condition while spaced to allow relative rotational movement therebetween necessary for pulling of a trailer hitch and attached trailer during turning operations.

In FIG. 5, the latch actuator assembly 30 is operable through a linkage type connection from the unlatched condition of FIG. 1 having the handle support shaft 44 and the support shaft member 54 providing fixed pivot points.

The intermediate link member 38 is pivotal about movable pivot points being the pivot shaft or pin 50 from the position in FIG. 5 to the rear pivoted position in the enclosed locked or latched condition as shown in FIG. 4.

This linkage condition allows the intermediate link member 38 to be passed over a center position so that any downward force by the hitch ball member 18 on the arcuate ball contact surface 58 operates in an "over dead center" manner. Any force from the hitch ball member 18 would tend to further enclose and secure the hitch ball latch assembly 26 against the outer spherical surface of the hitch ball member 18.

The hitch lock assembly 22 includes a pair of identical lock pin members 62 utilized with a padlock member 64 so as to engage and lock the hitch ball latch assembly 26 in a latched, locked condition as shown in FIG. 2.

Each lock pin member 62 is constructed preferably of a bent, high strength steel rod construction being of circular shape in transverse cross section.

Each lock pin member 62 includes a padlock section 66 integral with a horizontal spacer section 68 which is connected to a vertical intermediate section 70 which, in turn, is integral with a second horizontal spacer section 72 having connected thereto a vertical hitch lock section 74. All of the sections 66, 68, 70, 72, and 74 are aligned in a common plane.

The horizontal spacer section 68 and the second horizontal spacer section 72 are located in spaced horizontal and parallel common planes having the vertical intermediate section 70 extended to one side thereof so as to be operable to be placed laterally to extend outwardly of the main hitch housing assembly 24 in the assembled, locked condition.

The vertical hitch lock section 74 is extended perpendicular to the horizontal spacer section 68 and the second horizontal spacer section 72. The vertical hitch lock section is operable to be mounted through, and locked within, the latch receiving opening 33 in one of the side walls 29 of the main hitch housing assembly 24 and the lock anchor hole 60 in the ball contact member 40 in a manner to be described.

The padlock member 64 is of a conventional nature and could be a key lock, padlock, or combination padlock as desired. The main function thereof is to secure the lock pin members 62 in a locked condition as noted in FIG. 2.

More particularly, the padlock member 64 is provided with a padlock body section 80 having a shackle member 82 having a portion which is releasably connected to the padlock body section 80.

Use and Operation of the Invention

In the use and operation of the invention, the hitch ball latch assembly 26 is mounted about the hitch ball member 18 as noted in FIG. 5.

The hitch actuator assembly 30 and, more particularly, the latch handle member 36 has been actuated to a closed condition as noted in FIG. 4 whereupon the hitch ball member 18 is connected to, and enclosed by, the forward ball receiver member 28 and the arcuate ball contact section 58.

Next, the trailer/vehicle operator would take independently and respectively, each of the lock pin members 62 and insert the vertical hitch lock section 74 through the respective aligned latch receiving openings 33 in the side walls 29 of the main hitch housing assembly 24 and, concurrently, through an adjacent lock anchor hole 60 in the ball contact member 40 as noted in FIG. 4.

After inserting the vertical hitch lock section 74 therethrough, the entire lock pin member 62 would then be rotated upwardly to place the vertical intermediate section 70 in contact with outer respective surfaces of the side walls 29.

On achieving this movement by both of the lock pin members 62, this places the padlock section 66 and, more particularly, the circular ring portions 76, in adjacent parallel planes.

Next, the operator would open the shackle member 82 of the padlock member 64 and insert the shackle member 82 through the aligned central receiving openings of the circular ring portion 76 of the lock pin members 62.

The shackle member 82 would then be pushed inwardly into the padlock body section 80 to achieve the latched, locked condition as shown in FIGS. 2 and 4.

In this locked condition, it is noted that the respective lock pin members 62 thereupon secure the hitch ball latch assembly 26 to the main hitch housing assembly 24 so that the entire assembly cannot move from this latched, locked condition to a released condition without removing the padlock member 64 from its connection to the circular ring portions 76. Therefore, this achieves the secured, locked condition of the trailer hitch assembly 20 to the hitch ball member 18 which can only be released by removal of the padlock member 64 in a conventional manner.

The locked condition, as noted in FIG. 2, is unlocked by opening of the padlock member 64 to remove the shackle member 82 from its insertion through the adjacent circular ring portions 76 of the lock pin members 62.

Then, the respective lock pin members 62, on outward and downward movement, operate to remove the vertical hitch lock section 74 and the second horizontal spacer section 72 laterally of the respective latch receiving openings 33 and the lock anchor holes 60 to achieve the unlatched condition. Thereupon, the latch handle member 36 can be moved upwardly to the position as shown in FIG. 5 and the entire hitch ball latch assembly 26 can be removed from its latched condition about the hitch ball member 18.

The hitch lock assembly of this invention is economical to manufacture; rigid in construction to prevent unauthorized removal thereof from a trailer latch assembly; easy to use; and substantially maintenance free.

While the invention has been described in conjunction with preferred specific embodiments thereof, it will be understood that this description is intended to illustrate and not to limit the scope of the invention, which is defined by the following claims:

I claim:

1. A lock assembly for a trailer hitch, comprising:
   a) a trailer hitch assembly includes a main hitch housing assembly having spaced latch receiving openings and a hitch ball latch assembly;
   b) said hitch ball latch assembly includes a main actuator body having lock anchor holes aligned with respective ones of said latch receiving openings when in an enclosed condition about a hitch ball member;
   c) a pair of lock pin members, each of said lock pin members mounted transversely of aligned ones of said lock anchor holes and said latch receiving openings to prevent movement of said hitch ball latch assembly to an unlatched condition about said hitch ball member; and
   d) a lock means to hold said lock pin members in a latched condition to prevent movement therefrom from respective aligned ones of said lock anchor holes and said latch receiving openings.

2. A lock assembly as described in claim 1, wherein:
   a) each of said lock pin members having a spacer section connected to a hitch lock section extended perpendicular thereto; and
   b) when in the latched condition, said spacer section extended transversely of said latch receiving opening and said lock anchor hole with said latch lock section being perpendicular thereto to prevent transverse movement thereof to an unlatched condition without releasing said lock means therefrom.

3. A lock assembly as described in claim 2, wherein:
   a) each of said lock pin members being of a bent rod construction having a padlock section integral with a horizontal spacer section which is integral with a vertical intermediate section which is connected to said spacer section; and
   b) said padlock section having a ring portion to receive said lock means transversely thereof to hold in the latched condition.

4. A lock assembly as described in claim 3, wherein:
   a) said padlock section having said ring portion of an enclosed circular shape to receive a portion of said lock means therethrough to hold in a clamped condition.

5. A lock assembly as described in claim 3, wherein:
   a) said spacer section and said horizontal spacer section extended perpendicular to said intermediate section and parallel to each other so as to have said intermediate section placed against an outer surface of said main hitch housing assembly when in the latched condition.

6. A lock assembly as described in claim 1, wherein:
   a) each of said lock pin members having a padlock section of circular shape to receive said lock means therethrough and having a horizontal spacer section parallel to a second horizontal spacer section, both of which are extended laterally and in the same direction and perpendicular to said vertical intermediate section.

7. A lock assembly operable to be connected to a trailer hitch assembly mounted on a hitch ball member, comprising:
   a) said trailer hitch assembly includes a main hitch housing assembly and a hitch ball latch assembly;
   b) said main hitch housing assembly having a latch receiving opening;
   c) said hitch ball latch assembly includes a ball contact member having a main actuator body with a lock anchor hole which is aligned with said latch receiving opening when said trailer hitch assembly is enclosed about said hitch ball member;
   d) a lock pin member having a spacer section connected to a hitch lock section extended perpendicular thereto;
   e) said spacer section extended transversely of said latch receiving opening and said lock anchor hole with said hitch lock section extended perpendicular to said aligned axes of said latch receiving opening and said lock anchor hole;
   f) a lock means connected to said lock pin member to prevent movement thereof from said latch receiving opening and said lock anchor hole when in a latched, locked condition;
   g) a pair of said lock pin members, each having said spacer section connected to said lock section extended perpendicular thereto; and
   h) each of said spacer sections extended transversely of one of said latch receiving openings and adjacent ones of said lock anchor holes in said hitch ball latch assembly and said main hitch housing assembly, respectively.

8. A lock assembly as described in claim 7, wherein:
   a) each of said lock pin members of an irregular shape having a padlock section to receive said lock means therethrough in a locked condition;
   b) said lock padlock section connected to a horizontal spacer section which is integral with a vertical intermediate section which is integral with said spacer section which, in turn, is integral with said vertical lock section; and
   c) said horizontal spacer section and said spacer section mounted about said main hitch housing assembly when in a locked condition.

9. A lock assembly as described in claim 8, wherein:
   a) said padlock section having a circular ring portion to receive said lock means therethrough to hold in a latched, locked condition.

10. A lock assembly as described in claim 8, wherein:
    a) said horizontal spacer section and said second horizontal spacer section extended in spaced, parallel planes 11. A lock assembly as described in claims 8, wherein:
    a) said lock means being a padlock member having a shackle member extended transversely of adjacent ones of said padlock sections to hold in a latched, locked condition.

12. A lock assembly for a trailer hitch, comprising:
a) a trailer hitch assembly includes a main hitch housing assembly having a pair of latch receiving openings and a hitch ball assembly;
b) said hitch ball latch assembly includes a main actuator body having a pair of lock anchor holes, each aligned with respective ones of said latch receiving openings when in an enclosed condition about a hitch ball member;
c) a pair of lock pin members, each of said lock pin members mounted transversely of aligned ones of said lock anchor holes and said latch receiving openings to prevent movement of said hitch ball latch assembly to an unlatched condition about said hitch ball member; and
d) a lock means to hold about lock pin members in a latched condition.

13. A lock assembly as described in claim 12, wherein:
a) each of said lock pin members having a padlock section integral with a horizontal spacer section which is integral with a vertical intermediate section which is connected to a spacer section; and
b) said padlock section having a ring portion to receive said lock means transversely thereof to hold in the latched condition.

14. A lock assembly as described in claim 13, wherein:
a) said padlock section having said ring portion of an enclosed circular shape to receive a portion of said lock means therethrough to hold in the latched condition.

15. A lock assembly as described in claim 13, wherein:
a) said spacer section and said horizontal spacer section extended perpendicular to said intermediate section and parallel to each other so as to have said intermediate section placed against an outer surface of said main hitch housing assembly when in the latched condition.

* * * * *